(12) United States Patent
Rakich

(10) Patent No.: US 8,625,939 B1
(45) Date of Patent: Jan. 7, 2014

(54) ULTRALOW LOSS CAVITIES AND WAVEGUIDES SCATTERING LOSS CANCELLATION

(75) Inventor: Peter T. Rakich, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 164 days.

(21) Appl. No.: 13/306,408

(22) Filed: Nov. 29, 2011

(51) Int. Cl.
*G02B 6/26* (2006.01)

(52) U.S. Cl.
USPC .............................................. 385/27; 385/30

(58) Field of Classification Search
USPC ........................................ 385/129, 27, 30, 39
See application file for complete search history.

(56) References Cited

U.S. PATENT DOCUMENTS

| | | | |
|---|---|---|---|
| 6,411,752 B1 * | 6/2002 | Little et al. ........................ | 385/17 |
| 7,110,632 B2 * | 9/2006 | Abeles ............................... | 385/15 |
| 7,894,696 B2 * | 2/2011 | Baehr-Jones et al. ........... | 385/122 |
| 7,929,817 B2 * | 4/2011 | Uemura et al. ................... | 385/50 |
| 7,941,014 B1 * | 5/2011 | Watts et al. ....................... | 385/32 |
| 8,032,027 B2 * | 10/2011 | Popovic ............................ | 398/82 |
| 2004/0114899 A1 * | 6/2004 | Mattsson ........................... | 385/129 |
| 2006/0062523 A1 * | 3/2006 | Guo et al. ......................... | 385/50 |
| 2006/0078254 A1 * | 4/2006 | Djordjev et al. ................. | 385/32 |
| 2006/0078258 A1 * | 4/2006 | Anisimov et al. ............... | 385/50 |
| 2009/0148115 A1 * | 6/2009 | Lee et al. .......................... | 385/132 |

OTHER PUBLICATIONS

Barwicz et al., "Fabrication of Add-Drop Filters Based on Frequency-Matched Microring Resonators", Journal of Lightwave Technology, vol. 24, No. 5, May 2006, pp. 2207-2218.

Barwicz et al., "Microring-resonator-based add-drop filters in SiN: fabrication and analysis", Optics Express, vol. 12, No. 7, Apr. 5, 2004, pp. 1437-1442.

Rakich et al., "Trapping, corralling and spectral bonding of optical resonances through optically induced potentials", Nature Photonics, vol. 1, Nov. 2007, p. 658-665.

Watts, et al., "Integrated mode-evolution-based polarization splitter", Optics Letters, vol. 30, No. 9, May 1, 2005, pp. 967-969.

Akahane et al., "Investigation of high-Q channel drop filters using donor-type defects in two-dimensional photonic crystal slabs", Applied Physics Letters, vol. 83, No. 8, Aug. 25, 2003, pp. 1512-1514.

(Continued)

*Primary Examiner* — Charlie Peng
(74) *Attorney, Agent, or Firm* — Martin I. Finston

(57) ABSTRACT

A waveguide system includes a first waveguide having surface roughness along at least one surface and a second waveguide substantially identical to the first waveguide and having substantially identical surface roughness along a corresponding side. The first and second waveguides are separated from each other by a predetermined distance and are configured to receive respective first and second light signals having antisymmetric modes. The predetermined distance between the first and second waveguide tends to cause cancellation of at least far-field polarization radiation emanating from the first and second waveguides and resulting from the surface roughness.

15 Claims, 11 Drawing Sheets

(56) References Cited

OTHER PUBLICATIONS

Vuckovic et al., "Optimization of the Q Factor in Photonic Crystal Microcavities", IEEE Journal of Quantum Electronics, vol. 38, No. 7, Jul. 2002, pp. 850-856.

Hu et al., "Low-loss high-index-contrast planar waveguides with graded-index cladding layers", Optics Express, vol. 15, No. 22, Oct. 29, 2007, pp. 14566-14572.

Notomi et al., "Ultrahigh-Q Nanocavity with 1D Photonic Gap", Optics Express, vol. 16, No. 15, Jul. 21, 2008, pp. 11095-11102.

Deotare et al., "High quality factor photonic crystal nanobeam cavities", Applied Physics Letters 94, 2009, pp. 121106-1-121106-3.

Popovic et al., "Multistage high-order microring-resonator add-drop filters", Optics Letters, vol. 31, No. 17, Sep. 1, 2006, pp. 2571-2573.

Barwicz et al., "Three-Dimensional Analysis of Scattering Losses Due to Sidewall Roughness in Microphotonic Waveguides", Journal of Lightwave Technology, vol. 23, No. 4, Sep. 2005, pp. 2719-2732.

Barwicz et al., "Polarization-transparent microphtonic devices in the strong confinement limit", Nature Photonics, vol. 1, Jan. 2007, pp. 57-60.

Song et al., "Ultra-high-Q photonic double-heterostructure nanocavity", Nature Materials, vol. 4, Mar. 2005, pp. 207-210.

\* cited by examiner

ULTRALOW LOSS CAVITIES AND WAVEGUIDES SCATTERING LOSS CANCELLATION

STATEMENT OF GOVERNMENT INTEREST

This invention was developed under Contract DE-AC04-94AL85000 between Sandia Corporation and the U.S. Department of Energy. The U.S. Government has certain rights in this invention.

FIELD OF THE INVENTION

This application relates to waveguides and in particular waveguides that reduce radiation losses due to optical scattering.

BACKGROUND

Currently a limitation of the performance of optical microcavities and waveguides is posed by lithographically formed roughness generated through the etch process which defines the sidewalls of waveguides and microcavities, including both microring and photonic crystal cavities. This lithographically formed roughness tends to scatter the light out of the guided optical modes generating optical losses that may be detrimental to the performance of the optical waveguides and cavities. While lithographic roughness can be improved somewhat by using highly controlled lithographic processes there is often no practical way to achieve the low loss level that is desirable for certain highly desirable applications in the context of integrated photonics.

SUMMARY

The present invention is embodied in a waveguide system including a first waveguide having surface roughness along at least one surface and a second waveguide substantially identical to the first waveguide and having substantially identical surface roughness along a corresponding surface. The first and second waveguides are separated from each other by a predetermined distance and are configured to receive respective first and second light signals having antisymmetric modes. The predetermined distance between the first and second waveguide tends to cause cancellation of at least far-field polarization radiation emanating from the first and second waveguides and resulting from the surface roughness.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
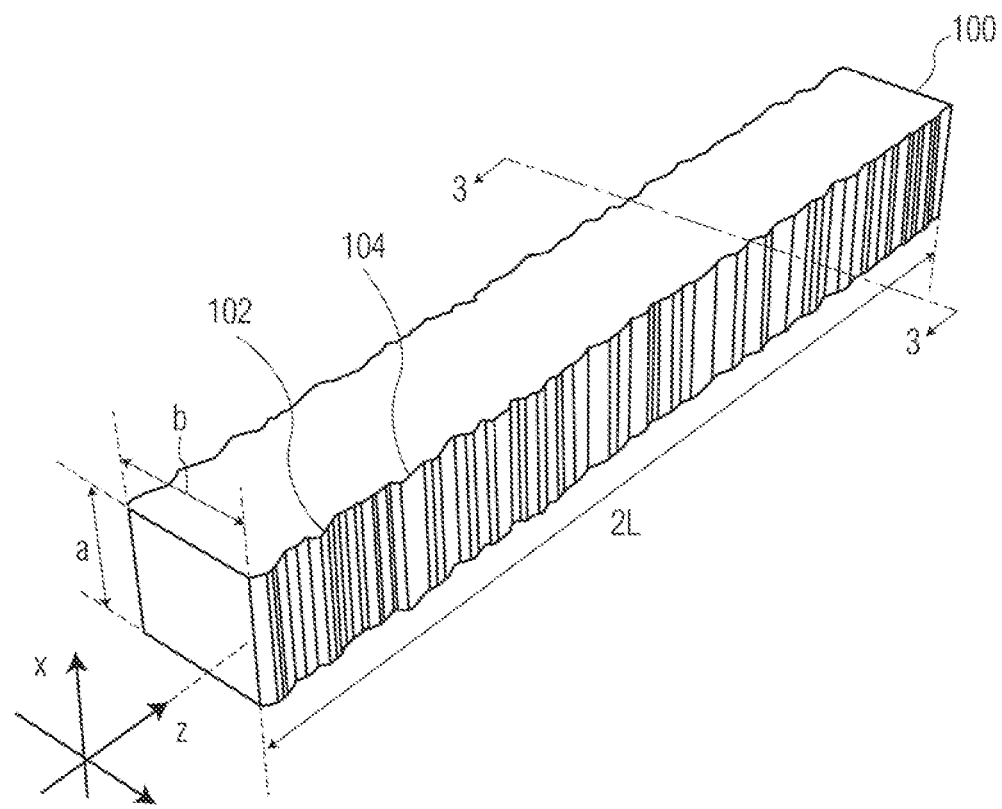
FIG. 1 is a perspective drawing of a waveguide that is useful for describing an problem addressed by embodiments of the invention.

FIG. 1 is a perspective drawing of a portion of a waveguide formed by a photolithographic process. This drawing is taken from an article by T. Barwicz et al. entitled "Three Dimensional Analysis of Scattering Losses Due to Sidewall Roughness and Microphotonic Waveguides," IEEE J. of Lightwave Tech. vol. 23. no. 9, pp 2719-2732 (2005). The drawing shown in FIG. 1 exhibits roughness as illustrated by the vertical ridges 102 and 104 along the sides of the waveguide. This roughness is typically caused by unevenness in the mask that is used to form the waveguide. The ridges shown in FIG. 1 are exaggerated to aid in the description of the invention.

Figure 2:
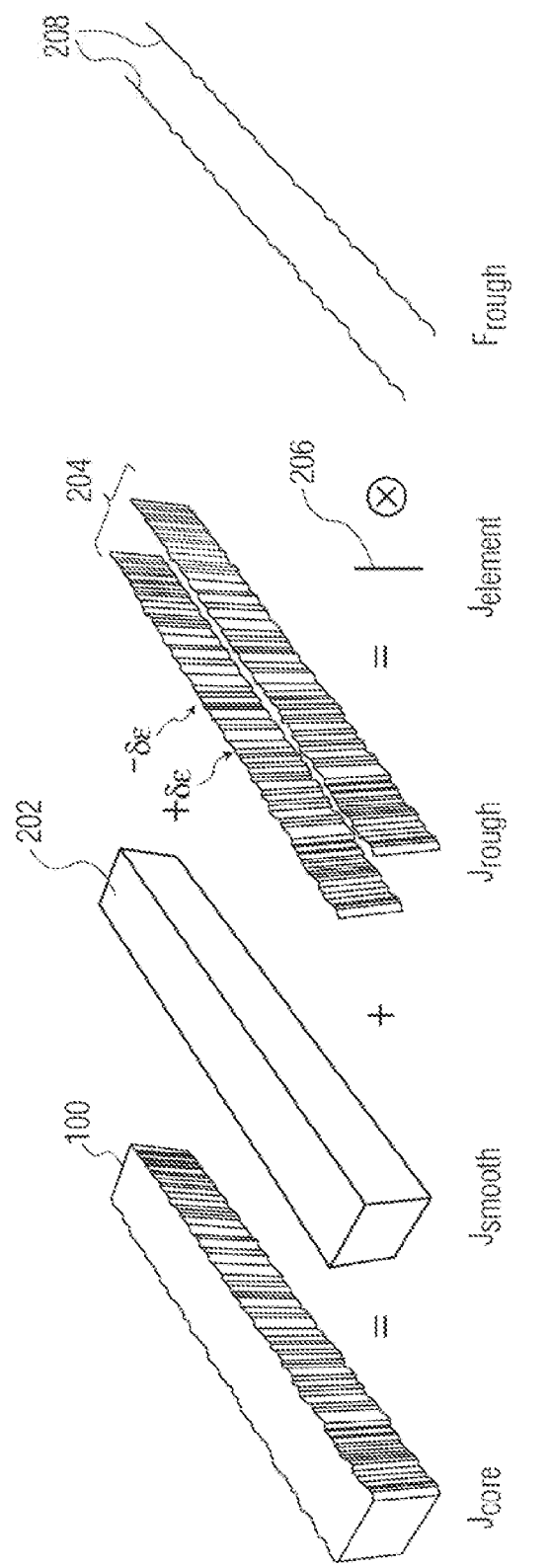
FIG. 2 is a set of perspective drawings that are useful for describing the problem addressed by the embodiments of the invention.

In the above-referenced article by Barwicz et al., the waveguide 100 is decomposed into a smooth waveguide 202 and the ridges 204, as shown in FIG. 2. The smooth waveguide does not contribute to the scattering loss radiation and so is ignored in the analysis. Barwicz et al. modeled each of the ridges as a dipole antenna 206 which, combined with the roughness function $F_{rough}$ 208, models the radiation field exhibited by the edges 204.

Figure 3:
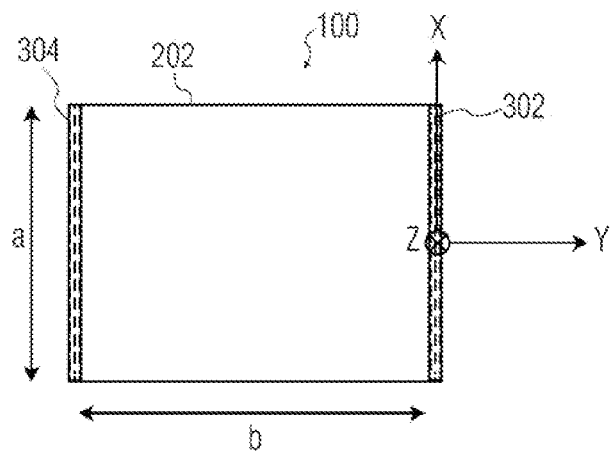
FIG. 3 is a cross-sectional view of the waveguide shown in FIG. 1 along the lines 3-3.
Figure 4:
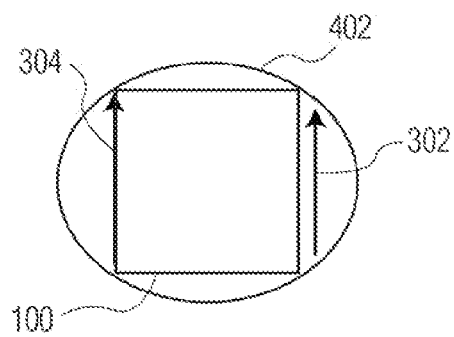
FIG. 4 is a cross-sectional view of the waveguide shown in FIG. 1 along the lines 3-3 that is useful for describing an embodiment of the invention.
Figure 5:
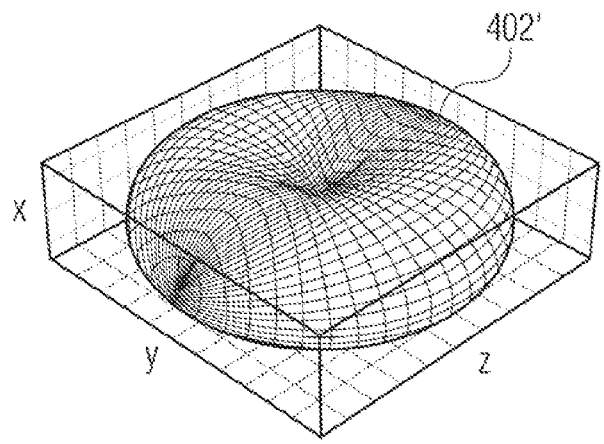
FIG. 5 is a perspective graph of the polarization field of a point source that is useful for describing an embodiment of the invention.

FIG. 3 is a cross section of the waveguide 100 along the line 3-3 as shown in FIG. 1. The waveguide includes the central portion 202 and two ridges 302 and 304. As described in the Barwicz article, each ridge 302 and 304 acts a dipole antenna generating a polarization current at the boundary. FIG. 4 is a cross sectional diagram illustrating the polarization radiation pattern 402. As shown in FIG. 5, the radiation pattern 402' generated by a point source with x polarization has the form of a flattened toroid. This radiation pattern may be generated by points along the ridges 302 and 304 to form the pattern 402, shown in FIG. 4.

The embodiments of the invention described below cancel this radiation by forming each waveguide as a system of two or more parallel waveguides in which light propagates through the multiple waveguides in an anti-symmetric super mode. In the examples described below, each waveguide includes at least a lower waveguide and an upper waveguide separated by a cladding material. Light is coupled into the waveguide system such that it propagates through the waveguide in an anti-symmetric mode. In one example embodiment, light propagating through the lower waveguide is primarily in the transverse magnetic (TM) mode while light propagating through the upper waveguide is primarily in the transverse electric (TE) mode. As described below with reference to FIG. 10, the effect of this construction is essentially to cancel the radiation fields generated by the polarization currents of the two waveguides, greatly reducing polarization radiation emitted by the waveguides, at least in the far field.

Figure 6A:
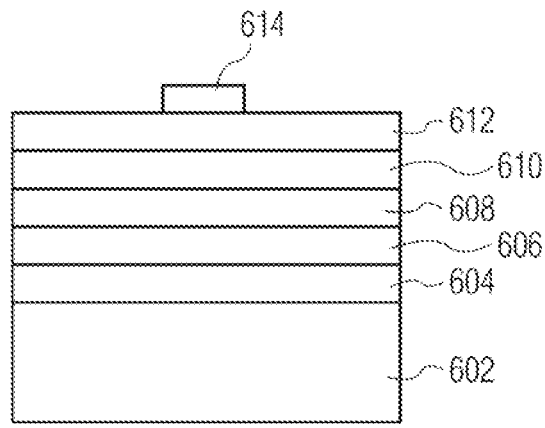
FIGS. 6A, 6B, 7A and 7B are cut-away side-plan views of a semiconductor device that may be used in an embodiment of the invention.
Figure 6B:
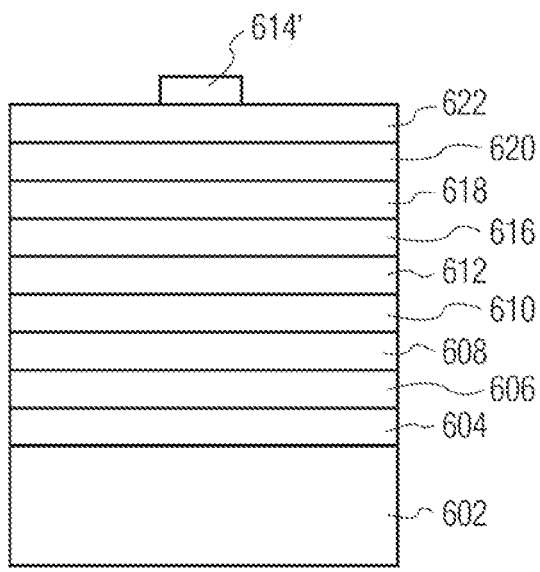

FIGS. 6 and 6A are a cut-away views of a cross-section of respective semiconductor wafers that illustrate the construction of an example waveguide. In the example shown in FIGS. 6A and 6B, layers of material having respective high and low indices of refraction are formed on top of a substrate. In the example shown in FIG. 6A, 602 is a silicon substrate and layers 604, 608 and 612 are formed of silicon dioxide $SiO_2$. The substrate 602 and the intervening layers 606 and 610 are formed of silicon. In this example embodiment, silicon layers 610 and 606 are waveguides covered on top and bottom by cladding layers 604, 608 and 612. These layers have a lower index of refraction than the waveguide layers 606 and 610. The device shown in FIG. 6B is similar to that shown in FIG. 6A except that the device in FIG. 6B includes two additional high-index layers, 616 and 620 and two additional low-index layers 618 and 622.

The described materials are exemplary. The waveguide system may be formed from other materials commonly used to form semiconductor waveguides, for example, alternating layers of indium phosphide (InP) and Indium Gallium Arsenide phosphide (InGaAsP). Alternatively, multiple layers of deposited amorphous materials such Silicon Nitride, or Bismuth Oxide may be used to form the waveguide system. In addition, dual or multiple layers of crystalline silicon can be used as the core material with a silica cladding formed through use of double or multiple layer silicon on insulator materials (SOI).

The item 614 shown in FIGS. 6A and 6B is a photo resist mask pattern that is used to form the waveguide in the compound structure. In a typical fabrication process, an etchent may be applied to the semiconductor wafer as shown in FIG. 6 to selectively remove portions of the semiconductor wafer that are not covered by the mask 614. This removal operation may be down to stop etch layer (not shown) formed between the layers 602 and 604. During the etching process, unevenness along the edges of the mask may cause vertical ridges, such as the ridges 102 and 104 shown in FIG. 1, on the side surfaces of the waveguide. Alternatively, the pattern may be transferred to a third material, such as nickel which acts as a robust hard-mask during the lithography process. An example process for forming waveguide systems using such a third material is described in an article by T. Barwicz et al. entitled "Microring-resonator-based add-drop filters in SiN: fabrication and analysis," Optics Express Vol. 12, No. 7, April 2004.

Figure 7A:
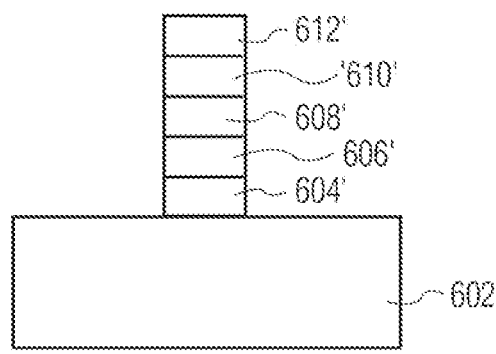
Figure 7B:
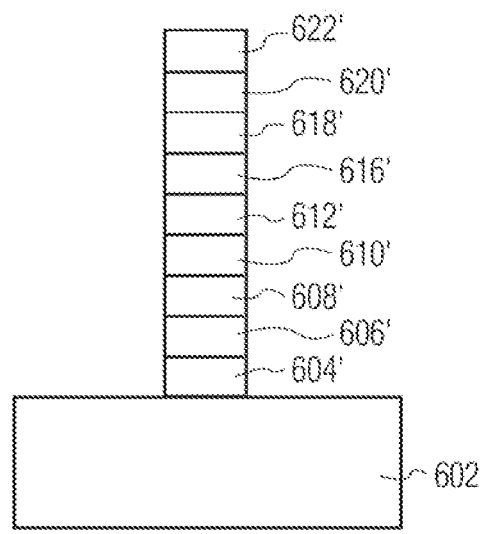

FIGS. 7A and 7B show the devices after the etching operation and after the photo resist 614 has been removed. The example devices shown in FIGS. 7A and 7B each includes layers 604', 608' and 612' having a relatively low index of refraction and layers 606' and 610' having a relatively high index of refraction. The device shown in FIG. 7A includes the additional high-index layers 616' and 620' as well as the additional low-index layers 618' and 620'. The sides of the waveguide layers are subject to the ambient atmosphere which also has a lower index of refraction than the silicon layers 606' and 610'.

Figure 8:
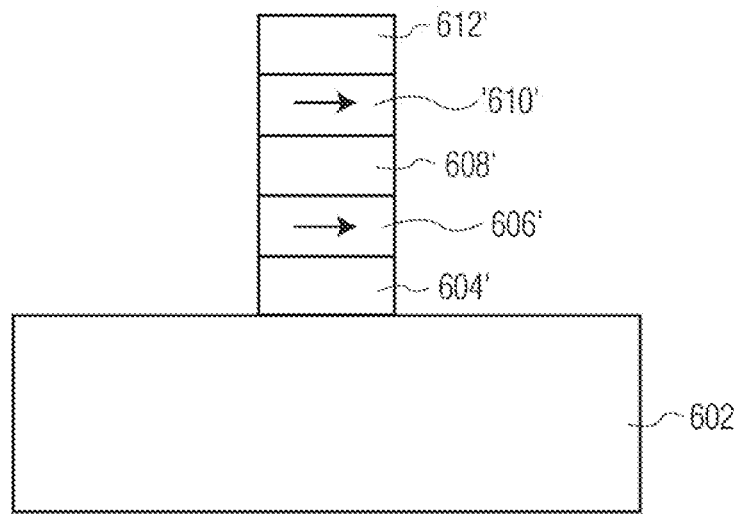
FIGS. 8 and 9 are cut-away side-plan views of the semiconductor device that are useful for describing an embodiment of the invention.
Figure 9:
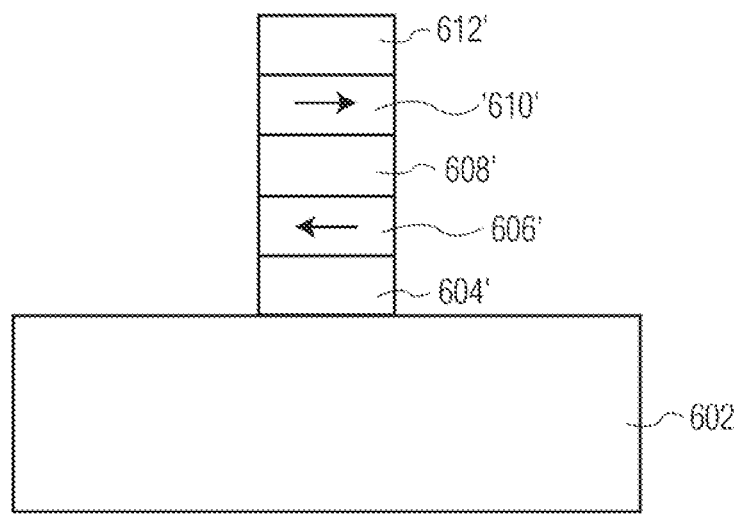

The difference between the index of refraction of the layers 606' and 610' on the one hand and the index of refraction of the layers 604', 608' and 612' and the surrounding atmosphere on the other hand, causes light to propagate through layers 606' and 610' in a mode that depends on the spacing between layers 606' and 610' (i.e., the thickness of layer 608'). As shown in FIGS. 8 and 9, light may propagate through the two waveguides 606' and 610' in a symmetric mode (FIG. 8) or in an anti-symmetric mode (FIG. 9). Because the roughness on both waveguides 606' and 610' is substantially identical, as it results from the etch process that defines both waveguides, the roughness produced dipole moments may be identical and perfectly in phase in the case of symmetric mode as shown in FIG. 8 or identical and 180° out phase in the case of the anti-symmetric mode shown in FIG. 9. This feature of the waveguide system may be used to effectively cancel the scattering induced radiation emanating from the waveguide, at least in the far field.

Figure 10:
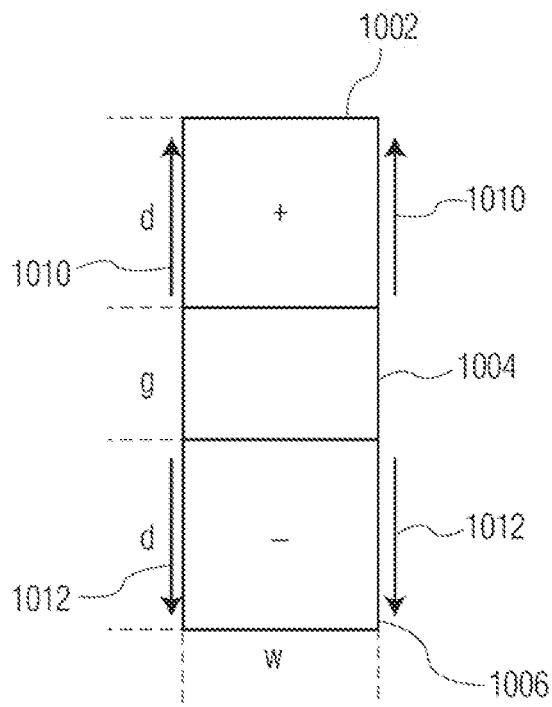
FIG. 10 is a cut-away side plan view of a portion of the semiconductor device that is useful for describing an embodiment of the invention.

FIG. 10 shows two waveguides 1002 and 1006 separated by an intervening cladding layer 1004. In the example shown in FIG. 10 each of the waveguides 1002 and 1006 has a depth d and width w. The two waveguides 1002 and 1006 are separated by the cladding layer having a depth g and a width w. The plus sign on the waveguide 1002 and the minus sign on the waveguide 1006 indicate that the compound waveguide is operating in the anti-symmetric mode. In this mode the dipoles 1010 on the waveguide 1002 and the dipoles 1012 on the waveguide 1006 exhibit radiation patterns that are 180° out of phase and tend to cancel each other. The inventors have determined that with proper spacing of the waveguides 1002 and 1006 and proper sizing of each of the waveguides 1002 and 1006 at least the far field polarization radiation exhibited by the waveguide and caused by the roughness of the sides of the waveguide may be essentially cancelled.

The separation of the waveguides 1002 and 1006 depends on the wavelength of the light being transmitted through the waveguides. Coherent interference between the radiation patterns of the waveguides 1002 and 1006 have some impact on the radiation losses regardless of the separation. However, the largest effect is anticipated where the dipole moment of the scattering system (consisting of the roughness from multiple waveguides) cancels, or is near cancellation. When the dipole moment cancels, or nearly cancels, only the quadripole and higher order multipole moments remain. These moments tend to have much poorer radiation efficiency, and therefore yield lower propagation losses. Broadband cancellation of the of the dipole moment most often occurs when the waveguide separation is smaller than an optical wavelength.

Figure 11:
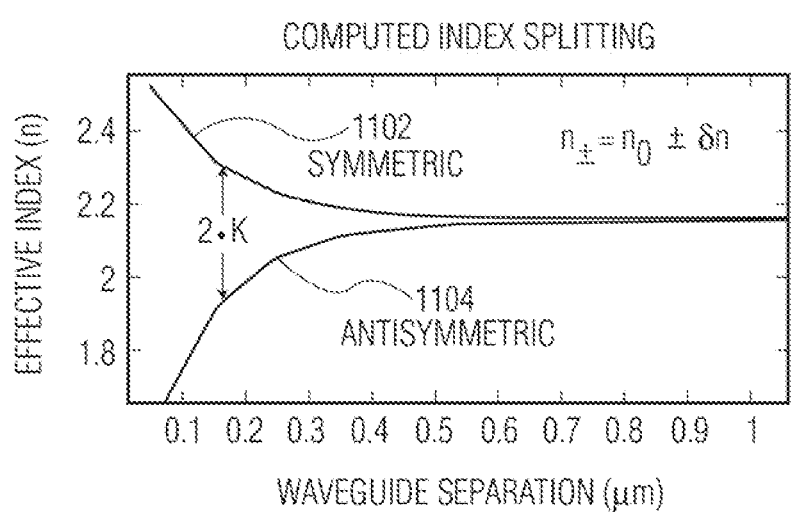
FIG. 11 is a graph of effective index of refraction versus waveguide separation that useful for describing an embodiment of the invention.

As illustrated in FIG. 11, however, the structure of the two waveguides in the anti-symmetric mode may not be identical to that of a single waveguide or to the structure waveguides operating in the symmetric mode. This is because the waveguides operating in the anti-symmetric mode may have a lower effective index of refraction and, thus, less confinement of the optical beam than either a single waveguide or a waveguide system operating in the symmetric mode. For a linear waveguide, this effect may be compensated by forming thicker waveguides. Adaptations for specific embodiments on the invention are described below with references to FIGS. 15-18.

FIG. 11 is a graph of effective refractive index versus waveguide separation which shows that the compound waveguide mode (or super mode) produced by the dual waveguide structure result in a splitting of the effective refractive index of the waveguide system. Each waveguide has a different level of confinement within the high index region of the waveguide system. The symmetric mode has a large field energy between the waveguides while the anti-symmetric mode has a field null yielding weaker modal confinement. As described above, in order to cancel the roughness induced scattering it is desirable to use the anti-symmetric mode. It is noted that the use of the anti-symmetric mode is one example of such a system employing a super mode. Alternatively any multilayer structure such as that shown in FIG. 7B, having alternating different propagation modes defining more than two waveguide layers can also yield canceling anti-phase radiation in the far field.

Figure 12A:
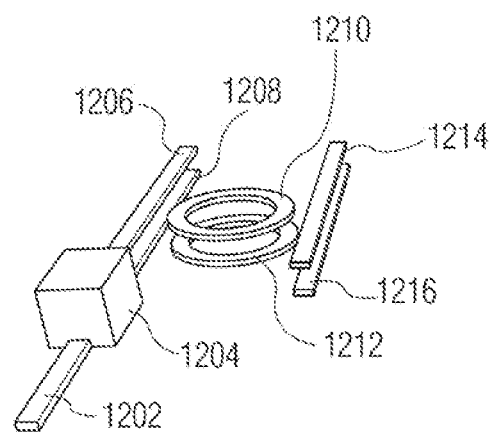
FIGS. 12a, and 12b are perspective drawings of an example embodiment.
Figure 12B:
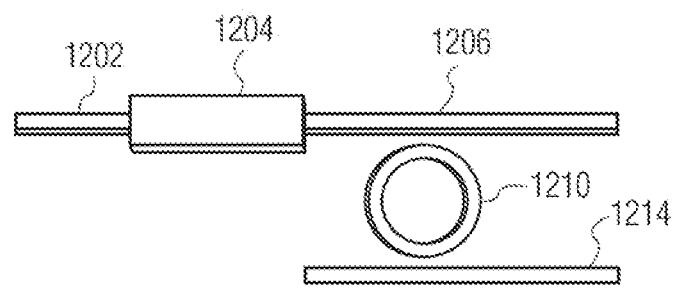

An example embodiment of the present invention is shown in FIGS. 12A and 12B. As shown in these Figs., an input waveguide 1202 couples light into a mode converter 1204 which produces light having an anti-symmetric propagation mode in parallel waveguides 1206 and 1208. In the example, this light is evanescently coupled to a microring resonator optical filter formed by microring resonators 1210 and 1212. Light at the resonant frequency of the microring resonators 1210 and 1212 is then coupled, also by evanescent coupling, into output waveguides 1214 and 1216. As described above, the operation of the device shown in FIGS. 12A and 12B may be significantly improved over that of a single layer device, because the roughness induced polarization radiation in the paired waveguides 1206, 1208; 1210, 1212; and 1214, 1216 is essentially cancelled due to the anti-symmetric super mode propagation of light through the waveguides.

By adding one or more microring resonators, the example microring resonator device shown in FIGS. 12a and 12b may, for example, be used as an add-drop filter as described in an article by Barwicz et al. entitled "Fabrication of Add-Drop Filters Based on Frequency-Matched Microring Resonators," J. Lightwave Tech. vol. 24, no. 5 May 2006, that describes a single-layer microring resonator device.

Figure 13:
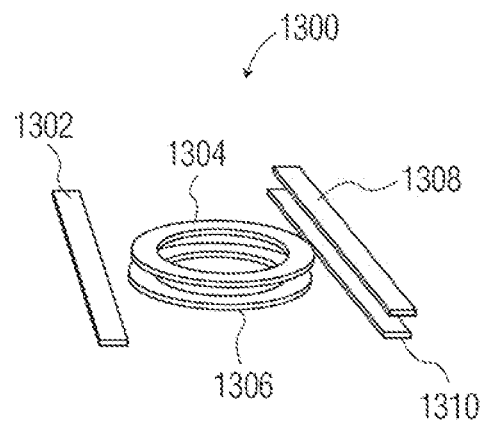
FIGS. 13 and 14 are perspective drawings of example mode converters that may be used in the example embodiment shown in FIGS. 12a and 12b.
Figure 14:
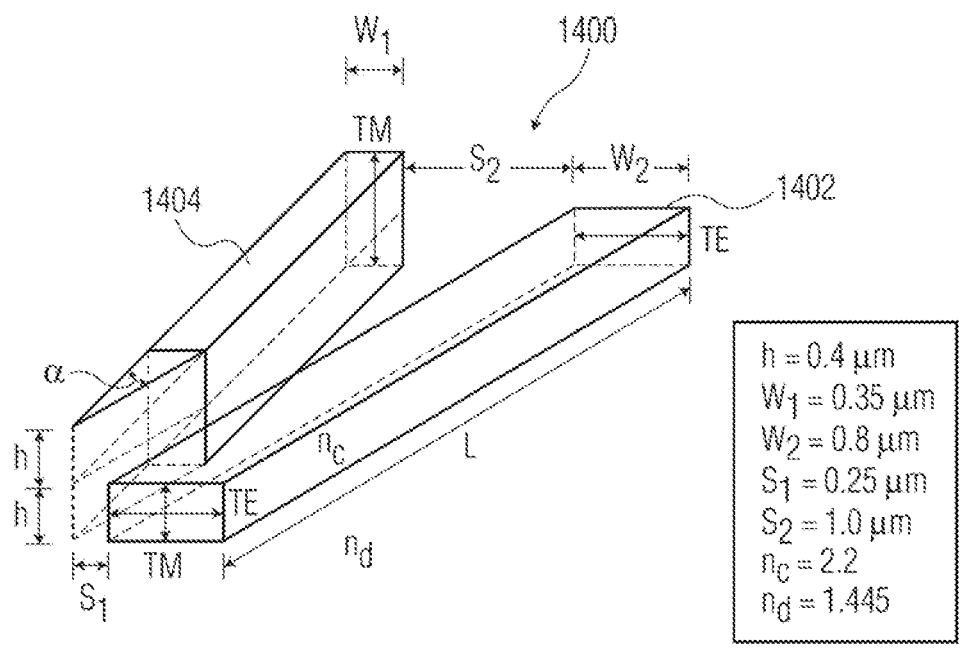

FIGS. 13 and 14 are examples of mode converters that may be used with the ring resonator system shown in FIGS. 12A and 12B or with a photonic crystal cavity structure shown in FIGS. 15 and 16, described below. In FIG. 13, input waveguide 1302 provides light to parallel ring resonators 1304 and 1306. By properly spacing the waveguides 1304 and 1306 relative to the waveguide 1302 light propagating in the waveguide 1306 may be in different, antisymmetric modes. Light from the two rings 1306 and 1304 may, in turn, be coupled into the linear waveguides 1310 and 1308 respectively via evanescent coupling. The waveguides 1308 and 1310 form the output of the mode converter 1300. In order to perform as a mode converter, the converter is designed to have a particular spacing between the two ring resonators 1304 and 1306 and a particular vertical position of the input waveguide 1302 relative to the ring resonators 1304 and 1306. The design parameters of an example converter are described in an article by P. T. Rakish et al. entitled "Trapping, corralling and spectral bonding of optical resonances through optically induced potentials," Nature Photonics vol. 1 Nov. 2007 www.nature.com/naturephotonics.

FIG. 14 is a perspective drawing of an example alternative adiabatic mode converter that may be used with the embodiments of the invention. In this mode converter two waveguides 1402 and 1404 are arranged as shown in FIG. 14 having a separation S1 at one side of the two waveguides and a separation S2 at the other side of the two waveguides the waveguides are also implemented to have different heights and widths. Light is applied to the waveguide 1402 in both the TM and TE modes. Due to the relative height and width of the two waveguides, however, only light in the TE mode propagates through the waveguide 1402 while only light in the TM propagates in the waveguide 1404. The far ends of the waveguides 1402 and 1404 as shown in FIG. 14 provide the output of the mode converter. The design parameters for this mode converter are described in an article by M. R. Watts et al. entitled "Integrated mode-evolution-based polarization splitter," Optics Letters, vol. 30, no. 9, May 2005.

Figure 15:
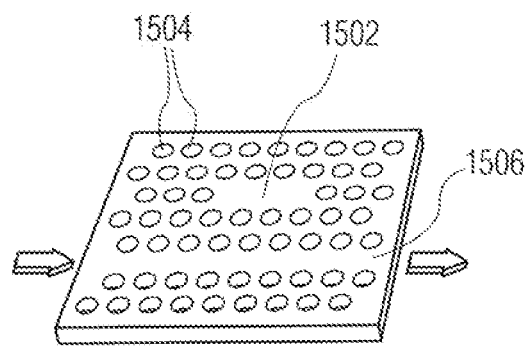
FIGS. 15 and 16 are perspective drawings of a one-layer and two-layer photonic crystal cavity device that are useful for describing the structure of an example embodiment.
Figure 16:
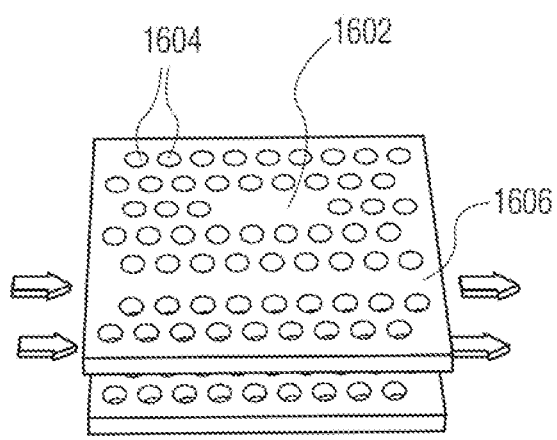

FIGS. 15 and 16 illustrate a photonic crystal cavity device that may, for example, implement a high-Q channel drop filter. As shown in FIG. 15, a conventional photonic crystal device includes an array of regularly spaced apertures 1504 which form the photonic crystal matrix. Apertures are omitted from a portion of the matrix 1502 to create a cavity, and from a portion 1506 to create a waveguide. These omitted apertures give the device its characteristic as a drop filter. As described above, roughness along the edges of the apertures 1504 may result in unwanted polarization radiation which tends to reduce the efficiency of the device by reducing the optical power of the signals that may be transmitted through the device. A photonic crystal cavity device according to the an embodiment of the subject invention is shown in FIG. 16. As shown, parallel photonic crystal devices are separated by a distance suitable to produce a canceling effect for any radiation dipoles caused by roughness in the apertures 1604. A single-layer photonic device similar to that shown in FIG. 15 may be used to implement a high-Q channel add/drop filter as described in an article by Y. Akahane et al. entitled "Investigation of high-Q channel drop filters using donor-type defects in two-dimensional photonic crystal slabs," Applied Physics Letters, vol. 83, no. 8, August 2003.

The essential optical characteristics that change in going from the single layer device to a multilayer device are the vertical mode confinement and vertical mode profile. The vertical mode profile impacts the propagation constant and the lateral mode confinement. Thus, in order to recover identical external coupling to the microcavity while reducing the roughness induce scattering losses, the layer thickness hole radius and hole spacing may need to change. In particular it may be desirable to increase the layer thickness to achieve the same modal confinement in order to achieve strong Bragg reflection within the photonic lattice. Furthermore because vertical mode confinement is closely linked to the effective index of refraction and the lateral confinement, it may be desirable to make a small adjustment of the design of the device to ensure proper coupling between photonic crystal cavity and photonic crystal waveguide. For a particular device, such an adjustment may be achieved in a straight forward manner using finite time domain and finite element modeling techniques.

Figure 17:
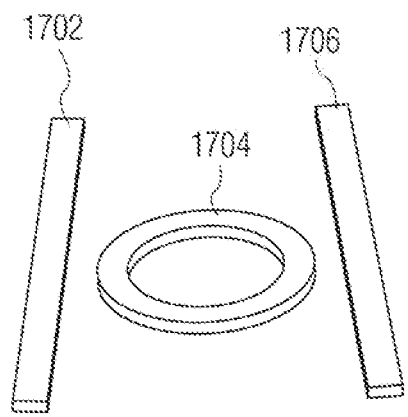
FIGS. 17 and 18 are perspective drawings of a one-layer and two-layer ring resonator device that are useful for describing the structure of an example embodiment.

FIG. 17 illustrates a microring resonator device that may be used an add or drop filter as is well known. In a single layer device, light propagating through an input waveguide 1702 resonates in a microring resonator 1704 and is provided to in an output waveguide 1706. This structure may be used to remove (i.e., drop) a wavelength band from the input waveguide 1702 or to add the wavelength band to the output waveguide 1706. As described above, one or more additional microring resonators may be included in the device.

Figure 18:
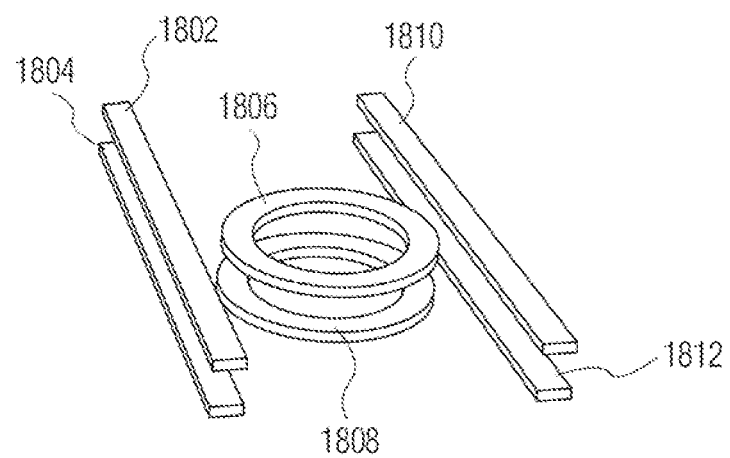

FIG. 18 shows a similar device implemented in the two layer structure as described above. In this device optical energy propagates through input waveguides 1802 and 1804 in an anti-symmetric super mode and is coupled to parallel microring resonators 1806 and 1808 also in the super mode. Finally the optical energy from the resonators 1806 and 1808 is coupled to the output waveguides 1810 and 1812.

To adapt the microring design from a single layer to a dual layer system employing the anti-symmetric super mode, it may be desirable to increase the layer thickness to achieve the same modal confinement that is desirable to implement tight bends within the microring. In addition because the vertical mode confinement is closely linked to the effective index of refraction and the lateral confinement, it may be desirable to implement a small correction in the ring bus coupling gap and the waveguide width. For a particular device, this modification can be achieved in a straightforward manner using finite time domain and finite element modeling techniques.

While two embodiments of the invention, a microring resonator device and a photonic crystal cavity device have been described, the subject invention has much broader application and may be used in any optical device having waveguides that are subject to unwanted polarization radiation due to roughness along the waveguide surfaces. To reduce this radiation, the device may be formed as two substantially identical vertically parallel devices having substantially identical waveguides separated by a small distance. Input light to the device is desirably mode-converted to propagate through the vertically parallel devices in an antisymmetric super mode. It may also be desirable to mode convert the light at the output of the device to provide an output signal having, for example, both TE and TM modes.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system of waveguides comprising:
   a first waveguide having surface roughness along at least one surface; and
   a second waveguide substantially identical to the first waveguide and having surface roughness along a corresponding at least one surface of the second waveguide that is substantially identical to the surface roughness on the at least one surface of the first waveguide;
   wherein the first waveguide is separated from the second waveguides by a predetermined distance;
   wherein the first and second waveguides are configured to receive respective first and second light signals having antisymmetric modes and to propagate the first and second light signals in an antisymmetric super mode; and
   wherein the predetermined distance between the first and second waveguide is effective for causing at least partial mutual cancellation of at least far-field polarization radiation emanating from the first and second waveguides and resulting from the surface roughness when the first and second waveguide are excited by a propagating antisymmetric super mode.

2. The system of waveguides according to claim 1, further comprising:
   a third waveguide having surface roughness that is substantially identical to the surface roughness of the first and second waveguides along a corresponding at least one surface of the third waveguide; and
   a fourth waveguide having surface roughness that is substantially identical to the surface roughness of the first, second and third waveguides along a corresponding at least one surface of the fourth waveguide;
   wherein the third and fourth waveguides are configured to receive respective third and fourth light signals having antisymmetric modes;
   wherein the third waveguide is separated from the fourth waveguide by a first further predetermined distance and the third and fourth waveguides are separated from the first and second waveguides by a second predetermined distance such that the first, second, third and fourth light signals propagating through the respective first, second, third and fourth waveguides propagate in a further antisymmetric super mode.

3. The system of waveguides according to claim 1, further including a mode converter that is configured to convert a single received light signal into the first and second light signals having antisymmetric modes.

4. The system of waveguides according to claim 3, wherein the mode converter is a microring mode converter.

5. The system of waveguides according to claim 3, wherein the mode converter is an adiabatic mode converter.

6. The system of waveguides according to claim 1, wherein:
   the first waveguide and second waveguides each have a top surface, a bottom surface a right surface and a left surface;
   the first waveguide is positioned above the second waveguide;
   the left surfaces of the first and second waveguides exhibit substantially identical roughness; and
   the right surfaces of the first and second waveguides exhibit substantially identical roughness.

7. The system of waveguides according to claim 6, wherein the first and second waveguides are formed on an integrated circuit substrate and the roughness on the right and left surfaces of the first and second waveguides results from photolithographic processing of the integrated circuit substrate and is in the form of vertical ridges.

8. The system of waveguides according to claim 1, wherein:
   the first waveguide and second waveguides each includes at least one microring resonator waveguide portion having a top surface, a bottom surface, an inner surface and an outer surface;
   the first waveguide is positioned above the second waveguide;
   the inner surfaces of the first and second waveguides exhibit substantially identical roughness; and
   the outer surfaces of the first and second waveguides exhibit substantially identical roughness.

9. The system of waveguides according to claim 8, wherein the first and second waveguides are formed on an integrated circuit substrate and the roughness on the inner and outer surfaces of the first and second waveguides is in the form of vertical ridges and results from photolithographic processing of the integrated circuit substrate.

10. The system of waveguides according to claim 9, wherein:
    the first and second waveguides further include respective first and second linear waveguide portions positioned with respect to the first and second microring resonators, respectively, to evanescently couple light from the first and second linear waveguides into the respective first and second microring resonators; and
    each of the first and second linear waveguide portions has a top surface, a bottom surface a right surface and a left surface;
    the left surfaces of the first and second waveguides exhibit substantially identical roughness; and
    the right surfaces of the first and second waveguides exhibit substantially identical roughness.

11. The system of waveguides according to claim 10, further including a mode converter that is configured to convert a single received light signal into the first and second light signals having antisymmetric modes, wherein the mode converter is configured to provide the first and second light signals to the first and second linear waveguides, respectively.

12. The system of waveguides according to claim 11, wherein the mode converter is a microring mode converter.

13. The system of waveguides according to claim 11, wherein the mode converter is an adiabatic mode converter.

14. The system of waveguides according to claim 1, wherein:
the first waveguide and second waveguides each includes at least one photonic crystal structure having a plurality of apertures each aperture having an inner surface;
the first waveguide is positioned above the second waveguide; and
the inner surfaces of the first and second waveguides exhibit substantially identical roughness.

15. The system of waveguides according to claim 14, wherein the first and second waveguides are formed on an integrated circuit substrate and the roughness on the inner surfaces of the first and second waveguides is in the form of vertical ridges and results from photolithographic processing of the integrated circuit substrate.

\* \* \* \* \*